United States Patent Office 3,179,733
Patented Apr. 20, 1965

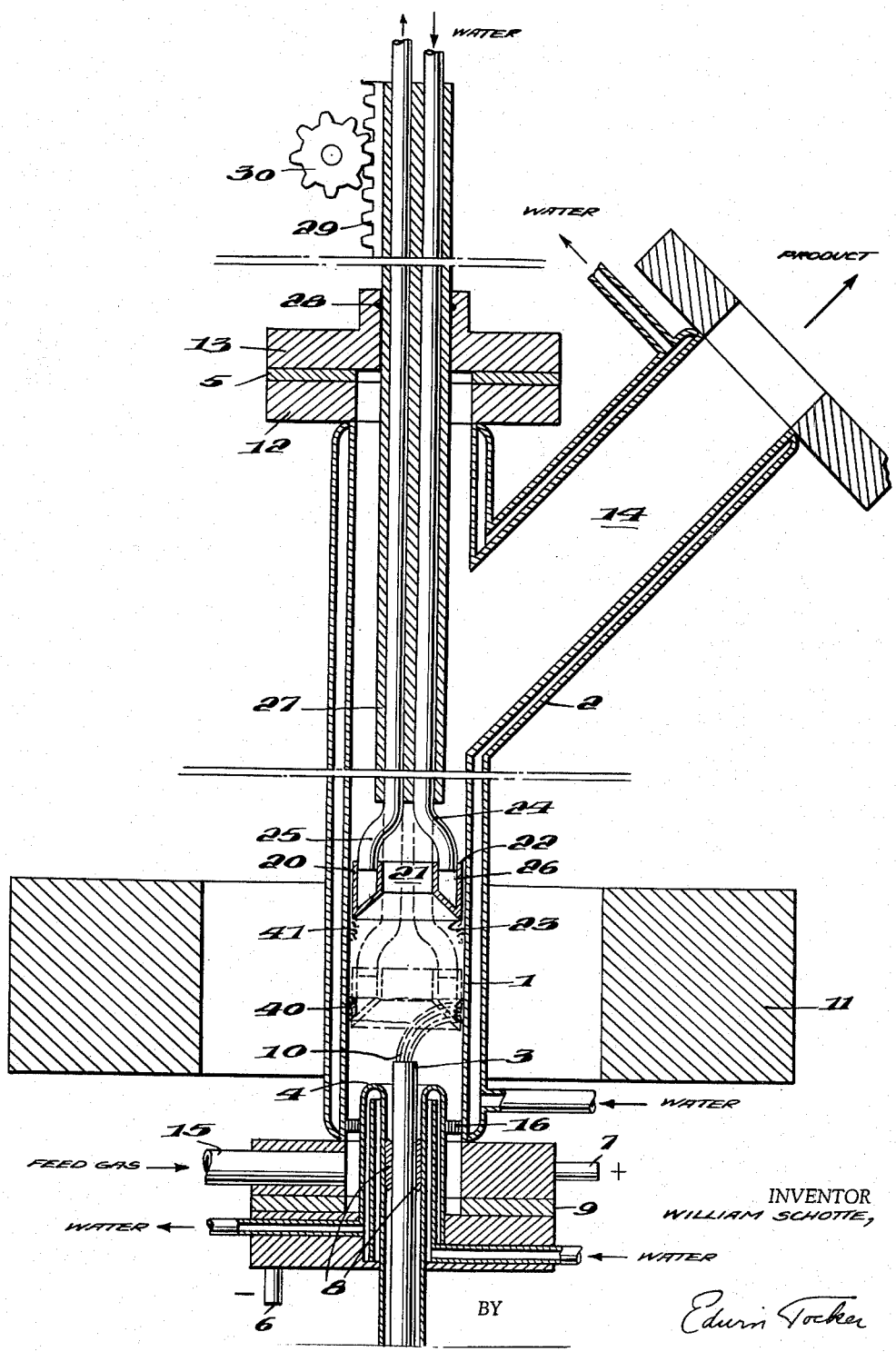

3,179,733
REMOVAL OF HARD CARBON DEPOSITS FROM THE ARC REGION OF AN ARC FURNACE
William Schotte, Wilmington, Del., assignor to E. I. du Pont de Nemours and Company, Wilmington, Del., a corporation of Delaware
Filed Oct. 18, 1962, Ser. No. 231,379
4 Claims. (Cl. 13—11)

This invention relates to an arc furnace in which chemical reactions are conducted by passing organic compounds through a magnetically rotated electric arc and more particularly to an improvement in the apparatus and method for carrying out such processes, whereby the carbon which is deposited on an electrode is readily removed and continuous operation, without shut-downs due to accumulation of carbon, is achieved.

When organic compounds are passed through an electric arc, for example of the type extending between a central cathode made of carbon and a surrounding anode in the form of a cooled metallic cylinder serving as the wall of the arc furnace and, in addition, the arc is rotated by means of an electromagnetic field, carbon usually deposits on both anode and cathode. Although carbon formation can be greatly reduced by proper selection of the operating conditions, it is still very undesirable to have it formed even gradually and in small amounts. Carbon deposits on the electrodes decrease the arc length, arc voltage, power input, and effective reactor cross section and consequently decrease the productivity of the arc furnace. Eventually the carbon deposits build up so as finally either to short-circuit the arc or to close the furnace to the passage of gas.

In furnaces of the type described, the carbon formation on the interior wall of the metallic cylinder, the anode, is usually and for the most part, loose and fluffy and downstream from the arc. Such deposits are easily removable by brushes and, to some extent, by merely tapping the exterior surface of the metallic cylinder. On the other hand, carbon deposits on the cathode are hard and tightly adherent thereto. They cannot be removed without stopping production, but they can be prevented from forming by adjustment of the current density. When the formation of these cathode deposits is thus eliminated, however, and the operation of the arc furnace for long periods becomes possible, then a relatively much slower formation of a similar, tightly adhering deposit in the anode region of the arc becomes a limiting factor to continuous production. Thus, in operation, while the loose, fluffy deposits on the anode are removed from the furnace downstream from the arc, the hard, tightly adherent carbon deposit accumulates on the anode in the arc region and finally constricts the opening within the cylinder enough to require the furnace to be taken out of production.

No method, analogous to that described above for cathode deposits is known for preventing the build up of hard carbon deposits on an anode. It is, therefore, imperative to have a way to remove these hard, firmly adhering deposits without adversely interfering with the operation of the arc furnace and thus the vapor-phase reaction. Removal of these deposits by chemical means, as by burning in oxygen, is impractical since it involves suspending production and then, after removing the hard carbon, taking further time to re-establish and adjust the arc. On the other hand, removing the hard carbon deposits mechanically from the arc region while the arc is operating seemed entirely unworkable. It was expected that interposition of a mechanical device in the arc region of the anode would interfere with the arc as by forming a barrier thereto or, if not, by changing the effective spacing between the electrodes and thereby changing the reaction conditions. It was further contemplated that to physically dislodge the hard, tenacious carbon deposit would require lengthy exposure of any mechanical means to arc temperatures and as a result, to render any such means ineffective. Although the fluffy deposits on the anode can be removed by known means, it would be desirable to have a single device for removing both the hard and the fluffy deposits.

It is an object of this invention to provide mechanical means and method for the removal of hard carbon deposits from a wall serving as an electrode in an arc furnace without adversely interfering with the operation of the furnace.

It is another object of the present invention to provide mechanical means for removing hard carbon deposits and accumulations of loose, fluffy carbon concurrently from an electrode surface of an arc furnace without interrupting operation of the furnace.

It is a further object of this invention to provide mechanical means and method to remove hard carbon deposits from the arc region of an electrode surface of a furnace during the operation thereof.

It is still another object of this invention to provide a scraping means to accomplish the foregoing aims and which is operative in a manner so as not to be adversely affected by arc temperatures. These and other objects will appear hereinafter.

These and other objects are accomplished by a cooled scraper member fitted slidably against the electrode surface upon which hard carbon deposits form as in the arc furnace hereinbefore described in which an arc is struck and rotated by electromagnetic means, and by means to slide the cooled scraper member along said electrode surface and into the hard carbon deposit to dislodge it. The scraping member must possess sufficient electrical conductivity to support the arc and sufficient cooling and/or refractoriness to withstand the heat therefrom.

With apparatus of the type just described, the arc furnace is operated in the manner comprising striking and maintaining an arc between spaced electrodes, one of which forms an annular wall around the other and between which reactants pass, and causing said arc to rotate, whereby a hard carbon deposit forms beneath the arc on said annular wall, the improvement comprising contacting intermittently the hard carbon deposit formed on the annular wall, during continuous operation of the arc furnace, with a cooled scraped member having a sharp contacting edge slidably fitted against said wall and with sufficient force to dislodge said hard carbon deposit. The furnace is preferably constructed so that the anode is in the form of a cylinder and the cathode is located axially therein.

The present invention will be better understood by reference to the drawing in which is shown in schematic vertical cross-section the essential features of one type of arc furnace with a cooled scraper member slidably located therein. The anode 1 shown in vertical section is in the form of a cylinder and serves as the furnace wall. Anode 1 is made of copper in the embodiment shown and is surrounded by a cooling jacket 2. Carbon cathode 3 is positioned centrally within said anode and is surrounded except at its tip by a shield 4, which may also be water-cooled. Electrical connections 6 and 7 are provided as shown for the anode 1 and cathode 3, respectively. Shield 4 is made part of the cathode circuit and is electrically connected to the cathode through contact shoes 8 tightly fitted between the shield and the cathode. Non-conducting gasket 9 is provided to electrically insulate anode 1 from shield 4. The arc 10 is formed between the cathode 3 and anode 1. Under the influence of the electromagnet 11, which produces a field parallel to the axis of the anode, the arc 10 is rotated about the cathode axis and strikes the anode 1 in a band as shown. It is here that the hard, adherent carbon deposit 40 is formed. Upstream from the arc 10, the anode, shown in indeterminate length, terminates in abutting flanges 12 and 13 having a gasket 5 therebetween. At a distance intermediate the flanges 12 and 13 and the arc, a branch tube 14 serving as the product outlet is provided. The gas to be treated by passage through the arc enters the furnace through inlet 15 and the distributing holes in a ceramic distributing plate 16, shown in cross-section, positioned across the annular space between the anode 1 and the shield 4. After passing through the rotating arc, the gas, which is then the reaction product, is cooled by flowing upward through the cylindrical water-cooled anode 1. Carbon of a light, fluffy, loosely adhering character forms on the anode at 41 and extends thereabove upstream from the arc and the hard carbon deposit 40.

The scraper 20, shown in the partly retracted position and in a cross-section, is a hollow, annular ring 21 of copper and fits against the inner wall of the anode 1 with a slight clearance 22, with its leading edge 23 bevelled so as to form a blunt cutting edge next to the anode surface. Tubes 24 and 25 serve to connect the scraper 20 to mechanical means for imparting reciprocating movement to the scraper along the anode surface and also to conduct cooling water into and away from the internal cooling passages 26 in the scraper. In the embodiment shown, the tubes 24 and 25 are mounted within the double longitudinal bore of cylindrical support 27, shown in cross-section. The support 27 passes through an opening in flange 13 wherein a seal is perfected by O-ring 28. A rack 29 is mounted upon the lateral side of said support and reciprocal motion of the support 27, tubes 24 and 25, and scraper 20 is obtained by manual or mechanical rotation of pinion 30 suitably mounted and coacting with the rack. The extended position of the scraper 20, in which it is passed into the arc in order to remove the hard, tightly adhering carbon deposit 40 formed where the arc strikes the anode 1, is shown by phantom lines in FIG. 1.

In operation, the arc is rotated by the electromagnet 11, and an organic compound, for example methane, is introduced through inlet 15 and distributing plate 16. Carbon gradually builds up as a hard deposit in a ring where the arc strikes the anode 1. This is removed periodically by moving the scraper along the anode by means such as the rack and pinion until it engages the deposit 40 and forces it away from the anode surface. In doing this the scraper moves into the arc 10, which then strikes it rather than the anode 1. The arc current then flows through the scraper 20, across the clearance 22 and any carbon deposited therein and then to the anode. Optionally, exterior the arc furnace, electrical connection (not shown) between scraper support 27 and anode 1 is provided to insure that arcing within clearance 22 is prevented. As the scraper 20 is retracted, the arc 10 returns without interruption to the anode. Surprisingly, no important change in arc voltage accompanies this movement of the arc from anode 1 to scraper and back. Only brief residence of the scraper blade within the arc is required. The water cooling is sufficient to prevent the copper scraper from melting under these conditions. These highly desirable features, the easy and rapid removal of the hard, firmly adhering carbon deposit, the non-extinction and stability of the arc, the permanence of the metal scraper within the arc and while serving temporarily as the anode, are all unexpected on the basis of general consideration of arc operation and the chemical reaction occurring within the region of the arc.

The scraper 20, when not operating in the arc region, may be used for removing the fluffy, loosely adhering carbon deposit which forms on the anode at 41 upstream from the arc. This operation presents no difficulties and goes on readily as would be expected, since it is away from the arc. The scrapings are blown upward out of the reactor by the flow of the gas passing through the furnace. By proper control of current densities at the cathode, carbon formation thereon is minimized and occurs mainly on the anode wall. By the cooled scraping member and the method of operating the arc furnace therewith as hereinbefore described, hard carbon deposits as well as loose carbon buildup are removed periodically before and without adversely affecting furnace operation.

Although the present invention has been described for a form of arc reactor in which the gas flows upward and is quenched by contact with a water-cooled extension of the anode, of large surface relative to the volume of gas, it may of course be applied to other types of reactor, in which for example, the gas flow is downward or the quenching is by a water spray or by circulated cooled particles. The form and motion of the scraper may also be varied. The polarity of the electrodes may be reversed and arc conditions adjusted so that the hard carbon deposit forms on the cathode which would be the annular wall of the arc furnace. It will be recognized that the scraping member can be made of materials other than copper so long as the substituted material has, in combination, mechanical strength at high temperatures, good electrical and thermal conductivity, and, in general, resistance to alteration and disintegration under the conditions applied. Thus stainless steel may be used advantageously at times and molybdenum and its alloys with titanium and zirconium are particularly effective.

The scraper is useful in connection with any arc reaction in which an organic compound is fed to the arc and carbon is formed. Such reactions include the dehydrogenation of hydrocarbons alone or in the presence of other compounds, such as ammonia.

As many apparently widely different embodiments of this invention may be made without departing from the spirit and scope thereof, it is to be understood that this invention is not limited to the specific embodiments except as defined in the appended claims.

What is claimed is:

1. In an arc furnace for continuous vapor phase reaction of organic compounds, in which a rotating arc passes along a path over the surface of the electrode serving as the wall of the furnace, a device for dislodging, without interrupting the operation of the arc, the hard, firmly adhering carbon formed where the arc strikes the wall, comprising a cooled scraper member fitting against said wall, and means for moving the scraper member intermittently through the arc to remove the hard carbon deposit therefrom.

2. In the rotating arc furnace of claim 1, wherein the wall of the furnace is tubular shaped and the cooled scraper member is an annular ring slidably fitted against the inner wall of said tubular shape.

3. A process comprising striking and maintaining an arc between spaced electrodes, one of which forms an annular wall around the other and between which reactants pass, and causing said arc to rotate, whereby a hard carbon deposit forms beneath the arc on said annular wall, the improvement comprising contacting intermittently said hard carbon deposit, during continuous operation of the arc furnace, with a cooled scraper member having a sharp contacting edge slidably fitted against said wall and with sufficient force to dislodge said hard carbon deposit.

4. In the process of claim 3, wherein the annular wall is the anode.

References Cited by the Examiner
UNITED STATES PATENTS
3,073,769    1/63    Doukas _____ 204—171

RICHARD M. WOOD, *Primary Examiner.*

JOSEPH V. TRUHE, *Examiner.*